United States Patent [19]
Görge et al.

[11] Patent Number: 6,019,813
[45] Date of Patent: *Feb. 1, 2000

[54] COBALT METAL AGGLOMERATES, PROCESS FOR PRODUCING THE SAME AND THEIR USE

[75] Inventors: Astrid Görge; Katrin Plaga, both of Goslar; Armin Olbrich, Seesen, all of Germany; Dirk Naumann, Ontario, Canada; Wilfried Gutknecht; Josef Schmoll, both of Goslar, Germany

[73] Assignee: H.C. Starck GmbH & Co. KG, Goslar, Germany

[*] Notice: This patent is subject to a terminal disclaimer.

[21] Appl. No.: 08/952,552

[22] PCT Filed: May 14, 1996

[86] PCT No.: PCT/EP96/02053

§ 371 Date: Apr. 24, 1998

§ 102(e) Date: Apr. 24, 1998

[87] PCT Pub. No.: WO96/37325

PCT Pub. Date: Nov. 28, 1996

[30] Foreign Application Priority Data

May 26, 1995 [DE] Germany .............. 195 19 329

[51] Int. Cl.[7] ........................................ B22F 9/00
[52] U.S. Cl. .................. 75/255; 75/369; 75/374; 75/430; 75/365; 419/13; 419/14; 419/18; 419/19
[58] Field of Search ............... 75/255, 626, 627, 75/430, 365, 343, 336, 369, 374; 419/13, 14, 15, 19

[56] References Cited

U.S. PATENT DOCUMENTS

| | | |
|---|---|---|
| 3,855,016 | 12/1974 | Ehrreich et al. . |
| 3,994,716 | 11/1976 | Huppmann et al. . |
| 4,093,450 | 6/1978 | Doyle . |
| 4,469,505 | 9/1984 | Cheresnowsky et al. ............. 75/365 |
| 4,588,572 | 5/1986 | Vincler et al. .................. 423/419 R |
| 4,798,623 | 1/1989 | Cheresnowsky ................... 75/365 |
| 4,927,456 | 5/1990 | Kopatz et al. ..................... 75/346 |
| 5,482,530 | 1/1996 | Hohne ............................. 75/230 |
| 5,594,929 | 1/1997 | Muhammed et al. .............. 419/1 |

FOREIGN PATENT DOCUMENTS

| | | |
|---|---|---|
| PCT/EP96/ 02053 | 2/1997 | European Pat. Off. ......... B22F 1/00 |
| 4343594C1 | 2/1995 | Germany . |

OTHER PUBLICATIONS

Kameswari, S. Preparation and Characterization of Fine Cobalt Metal and Oxide Powders, PMAI News Letter, vol. 4, No. 4, Sep. 1979 pp. 17–21.

*Primary Examiner*—Ngoclan Mai
*Attorney, Agent, or Firm*—Perkins, Smith&Cohen, LLP; Jerry Cohen

[57] ABSTRACT

The present invention relates to cobalt metal agglomerates consisting of peanut-shaped primary particles with average particle sizes in the range from 0.5 to 2 μm, to a process for the production thereof and to the use thereof.

12 Claims, 3 Drawing Sheets

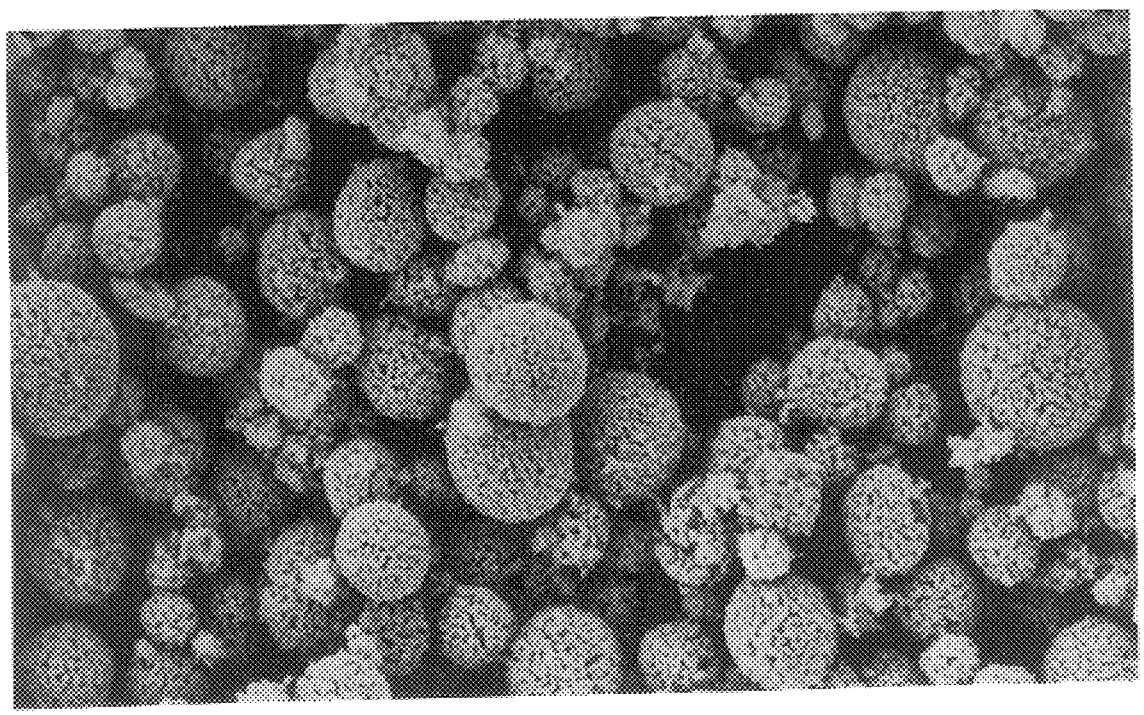
6624  20KV  X1,000  10μm  WD15  FIG. 3A
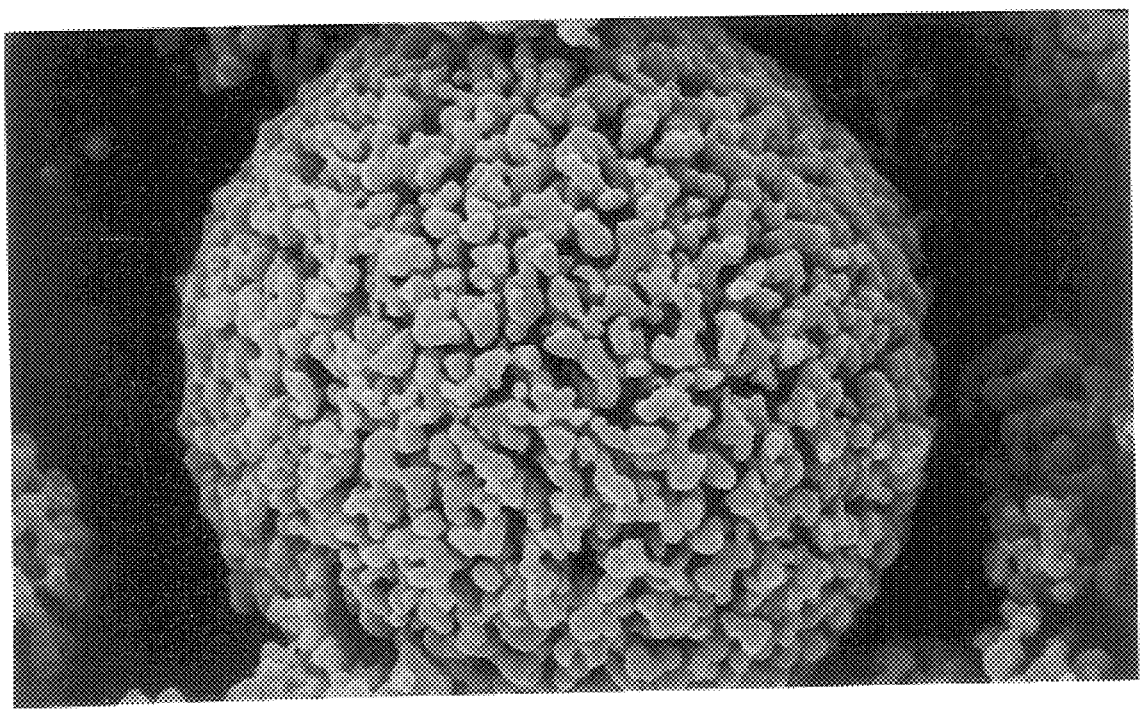
6624  20KV  X5,000  1μm  WD15  FIG. 3B

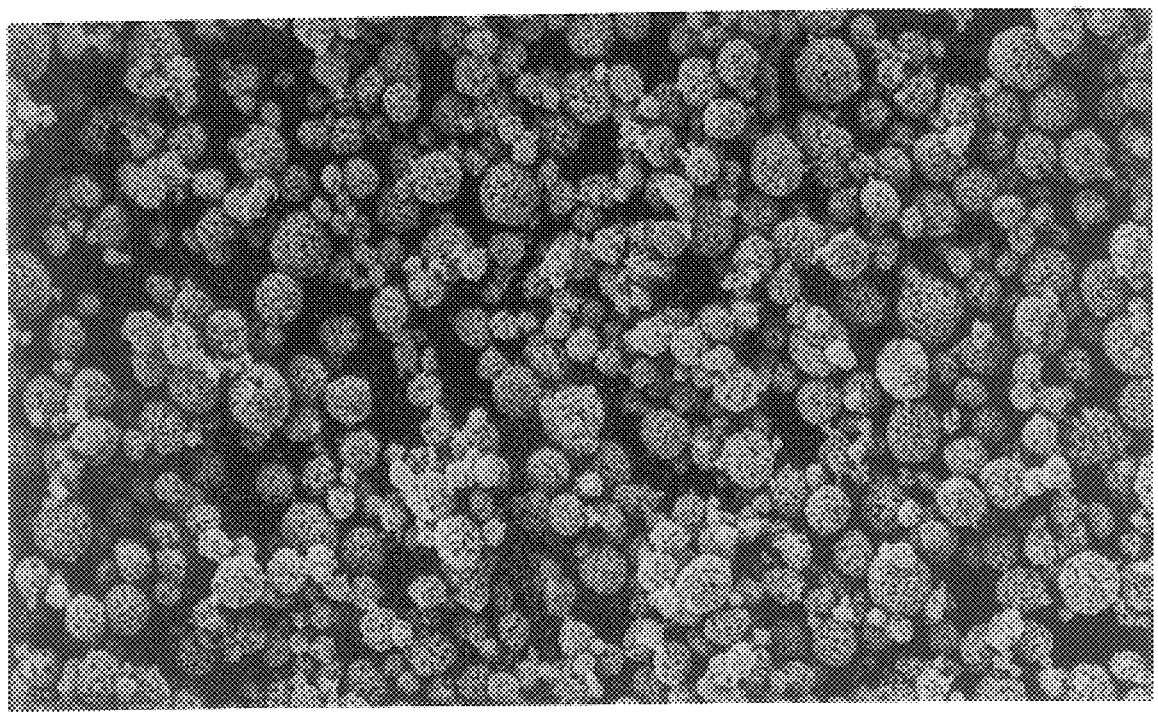
6648   20KV   X500   10um   WD16   FIG. 4A
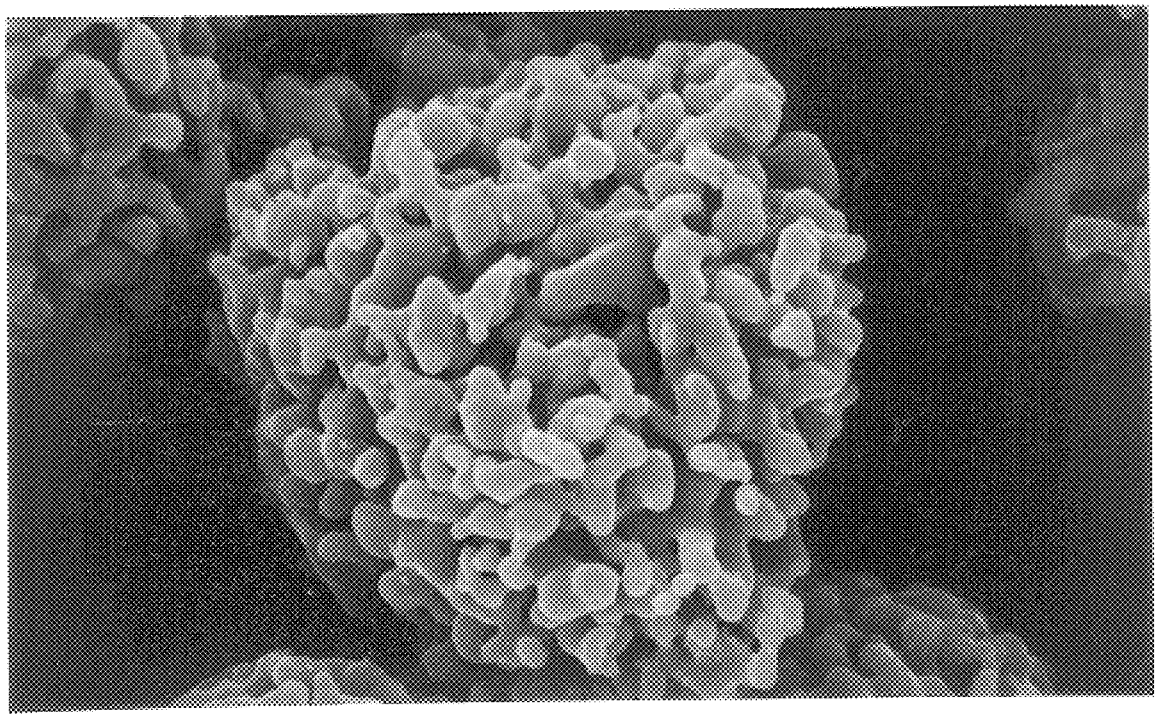
6648   20KV   X5,000   1um   WD16   FIG. 4B

COBALT METAL AGGLOMERATES, PROCESS FOR PRODUCING THE SAME AND THEIR USE

FIELD AND BACKGROUND OF THE INVENTION

The present invention relates to cobalt metal agglomerates consisting of peanut-shaped primary particles with average particle sizes in the range from 0.5 to 2 μm, to a process for the production thereof and to the use thereof.

Finely divided cobalt metal is mainly used as a binder in the production of hard metal and cutting tools based on various hard materials, such as for example WC, diamond, SiC and CBN. The cobalt metals used, for example, in the production of diamond tools must fulfil specific requirements. These include, in the first instance, that impurities such a Al, Ca, Mg, S and Si should be avoided as these elements readily form stabile oxides with the residual oxygen of the cobalt metal powder, so causing unwanted porosity in the segments.

It is also necessary, especially when producing segments with synthetic diamonds, to use only cobalt metal powders with very active sintering properties, as minimum densities of 8.5 g/cm$^3$ are required in this case. These densities should be achieved at a sintering temperatures of as low as <900° C. because the diamond may be converted into graphite at higher temperatures. If the sintering activity of the cobalt metal is inadequate, sufficient hardness is not achieved. Under the extreme stresses to which annular drilling bits or cutting tools are exposed, the abrasive action of stone dust leads to deep erosion and unwanted detachment of the diamonds or other hard materials and consequently a loss of cutting performance.

According to the prior art, cobalt metals are used, on the one hand, in the form of mixtures of atomised cobalt metal powders with hydrogen-reduced powders, as are disclosed in DE-A 4 343 594, on the other hand as ultra-fine and extra-fine grade cobalt metal powders.

Ultra-fine powders are differentiated by their FSSS value of <1.0 μm from extra-fine powders which have FSSS values of between 1.2 and 1.4 μm.

The small particle size and the resultant large surface areas of the described cobalt metal powders promote the absorption of atmospheric oxygen and moisture, which frequently leads to degradation of the flowability of the powders.

The object of the present invention was thus to provide a sintering active cobalt metal which does not exhibit the stated disadvantages, but does allow the production of segments with elevated density and hardness.

SUMMARY OF THE INVENTION

It has now proved possible to provide a cobalt metal powder which exhibits these required properties. These are cobalt metal agglomerates consisting of peanut-shaped primary particles with average particle sizes in the range from 0.5 to 2 μm, characterised in that they have a spherical secondary structure with average agglomerate diameters of 3 to 50 μm. These cobalt agglomerates are the subject matter of this invention. The agglomerate diameter of the cobalt metal agglomerates according to the invention is preferably 5 to 20 μm. By virtue of their spherical secondary structure they are distinguished by good flow properties.

The irregularly shaped elongated primary particles preferably have an average particle length of 0.5 to 2 μm and, generally, a diameter of <0.5 μm.

FIGS. 3A and 3B show 1000 and 5000 times magnification scanning electron micrographs of the cobalt metal powder agglomerates of the invention produced according to example 3.

The specific surface areas of the cobalt metal agglomerates according to the invention (determined using the nitrogen single point method to DIN 66 131) are preferably 2 to 3.5 m$^2$/g. These surface areas and the small particle sizes of the primary particles are responsible for the elevated sintering activity of the cobalt metal agglomerates according to the invention, from which sintered articles having densities of 8.5 g/cm$^3$ may be produced at temperatures of as low as 700° C.

The present invention also provides a process for the production of the cobalt metal agglomerates according to the invention. This process is characterised in that in a first stage an aqueous cobalt(II) salt solution of the general formula CoX$_2$, wherein X$^-$=Cl$^-$, NO$_3^-$ and/or ½ SO$_4^{2-}$ is reacted in a continuously operated tubular flow reactor with vigorous stirring with aqueous solutions or suspensions of alkali metal and/or ammonium carbonates and/or hydrogen carbonates. The temperature range for the reaction is here preferably between 60 and 90° C. In this process, in contrast with the conventional precipitation process, a rod-shaped crystallised cobalt carbonate is not formed, but instead a spherical basic cobalt carbonate. This is filtered and washed until free of neutral salt. In order to minimise the content of impurities which are critical for subsequent use, the resultant basic cobalt carbonate may be converted in a further processing stage into spherical cobalt(II) hydroxide by adding alkali and/or ammonia liquors. This processing stage is superfluous if suitably pure solutions are used during formation of the cobalt carbonate.

Cobalt(II) hydroxide or basic cobalt carbonate obtained in this manner is then subjected to reduction. To this end, the reaction is performed with a gaseous reducing agent, such as preferably hydrogen, methane, dinitrogen oxide and/or carbon monoxide, at furnace temperatures of 300 to 800° C., preferably of 350 to 650° C.

Unlike conventional known extra-fine and ultra-fine cobalt powders, the cobalt metal agglomerates according to the invention have very good flow properties by virtue of their spherical secondary structure.

By virtue of the described properties, the cobalt metal powders according to the invention are particularly suitable as binders in the production of hard metal and/or diamond tools. It should be noted that the cobalt metal powder agglomerates may here advantageously be used both alone and combined with other binder metals.

The present invention accordingly provides the use of the cobalt metal agglomerates according to the invention for the production of sintered cobalt articles and for the production of composite sintered articles based on cobalt metal and hard materials from the group comprising diamond, CBN, WC, SiC and Al$_2$O$_3$.

By virtue of the good flow properties and the fine primary structure of the cobalt metal powder agglomerates according to the invention, they are also particularly suitable for incorporation into the positive electrode composition containing nickel hydroxide in rechargeable batteries based on nickel/cadmium or nickel/metal hydride technologies.

During the so-called forming cycles, the cobalt metal is initially oxidised in accordance with its potential to cobalt (II). In the alkaline electrolyte (30% KOH solution), this forms soluble cobaltates(II) and is thus uniformly distributed within the electrode composition. On further charging, it is ultimately deposited as an electrically conductive CoO(OH) layer on the nickel hydroxide particles, so allowing the desired full utilisation to be made of the nickel hydroxide in the storage battery. The described anodic dissolution of the cobalt metal powder naturally proceeds all the faster and more effectively, the finer is the primary structure or the greater is the surface area of the metal powder.

The present invention thus also provides the use of the cobalt metal agglomerates according to the invention as a component in the production of positive electrodes in alkaline secondary batteries based on nickel/cadmium or nickel/metal hydride technologies.

BRIEF DESCRIPTION OF THE DRAWING

FIGS. 3A, 3B, 4A, 4B are scanning electron micrographs (SEMS) taken at magnifications and other standard conditions shown in legends of these figures for certain samples as indicated below.

DETAILED DESCRIPTION OF PREFERRED EMBODIMENTS

The invention is illustrated in examples below, without this constituting any limitation.

EXAMPLES

Example 1

20 l of water were introduced into a stirred flow reactor and heated to 80° C. 5 l/h of a 1.7 molar CoCl$_2$ and 19 l/h of a 0.9 molar NaHCO$_3$ solution were continuously metered into the reactor with vigorous stirring. Once the steady state had been reached, the resultant product was discharged from the reactor overflow, filtered and washed with water until free of neutral salt. The product was then dried to constant weight at T=80° C.

Chemical analysis of the basic cobalt carbonate obtained in this manner revealed a Co content of 54.3% and carbonate content was determined at 32.3%.

Example 2

500 g of basic cobalt carbonate, produced according to example 1, were suspended in 1.5 l of water. This suspension was combined, with vigorous stirring, with 200 g of NaOH dissolved in 500 ml of water. The temperature was then raised to 60° C. and the mixture stirred for 1 hour. The product was filtered, washed and dried to constant weight at T=90° C.

The yield was 426 g of spherically agglomerated, pure phase cobalt(II) hydroxide with a Co content of 63.3%.

Example 3

200 g of spherical cobalt(II) hydroxide, produced according to example 2, were weighed into a quartz boat and reduced in a stream of hydrogen for 1 hour at T=700° C. 126 g of spherically agglomerated cobalt metal were obtained. FIGS. 3A and 3B show 1000 and 5000 times magnification scanning electron micrographs.

Example 4

100 g of spherical basic cobalt carbonate produced according to example 1 were treated in a similar manner to example 3. The yield was 54 g of spherical cobalt metal powder. FIGS. 4A and 4B show 500 and 5000 times magnification scanning electron micrographs of this powder.

Example 5

Sintering test

Figure 1:
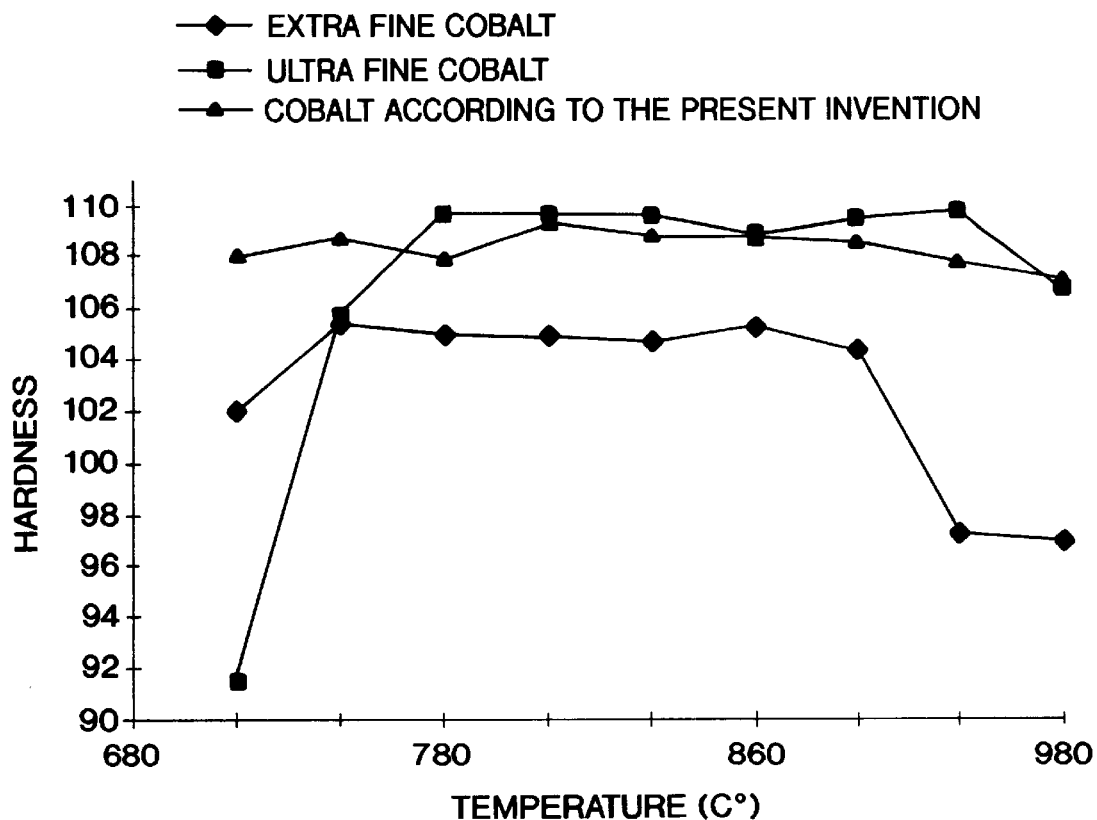
FIGS. 1–2 show plots of hardness values (FIG. 1) (HRB) and density (g/cm$^3$) (FIG. 2) of sintered samples at given sinter temperatures for cobalt ef (i.e. extra fine), cobalt uf (ultrafine) and cobalt inv., i.e. according to the present invention for diamond, square and triangle plotted points, respectively.

The cobalt metal agglomerates obtained according to example 3 were subjected to hot pressing tests under the following conditions:

Apparatus used: DSP 25-ATV (from Dr. Fritsch GmbH)
Heating time to final temperature: 3 min
Holding time: 3 min
Final pressure: 350 N/mm$^2$
Final temperature: see tables 1 and 2
Dimensions: 40×4×10 mm Table 1 and FIG. 1 show the hardness values of a sintered article produced from the cobalt metal powder agglomerate of the invention from example 3 in comparison with sintered articles produced from commercially available ultra- and extra-fine cobalt metal powders as a function of sintering temperatures. It may clearly be seen that elevated hardness values are obtained with the cobalt metal powder according to the invention at temperatures of as low as 700° C., the hardness values moreover remaining constant over the entire temperature range up to 980° C.

TABLE 1

| (Hardness values) Rockwell hardness values (HR$_B$) | | | | | |
|---|---|---|---|---|---|
| | 700° C. | 780° C. | 800° C. | 900° C. | 980° C. |
| Co uF[1)] | 91.5 | 109.8 | — | 109.7 | 107 |
| Co eF[2)] | 102.5 | 105 | — | 104.6 | 97.2 |
| Cobalt metal powder from example 3 | 107.9 | — | 109.4 | 108.8 | 107.4 |

Figure 2:
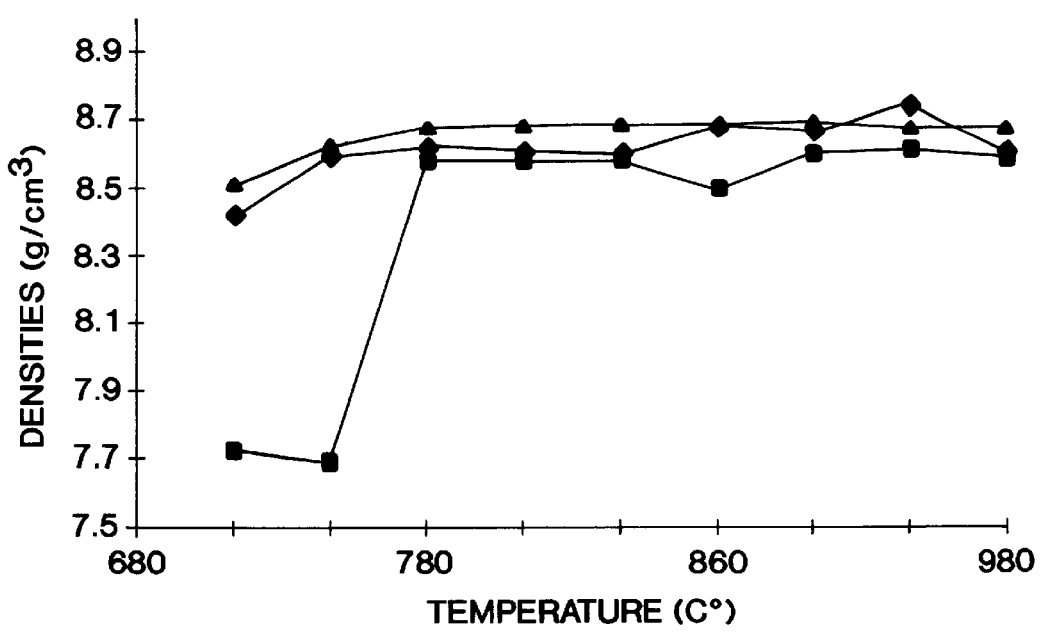

[1)]Ultra-fine cobalt metal powder supplied by Eurotungstene Grenoble, France
[2)]Extra-fine cobalt metal powder supplied by Hoboken Overpelt, Belgium Table 2 and FIG. 2 show the densities of a sintered article produced from the cobalt metal powder agglomerate of the invention from example 3 in comparison with sintered articles produced from commercially available ultra- and extra-fine cobalt metal powders as a function of sintering temperatures.

TABLE 2

| (Densities) Densities [g/cm$^3$] | | | | | |
|---|---|---|---|---|---|
| | 700° C. | 780° C. | 800° C. | 900° C. | 980° C. |
| Co uF[1)] | 7.72 | 8.58 | — | 8.60 | 8.59 |
| Co eF[2)] | 8.42 | 8.62 | — | 8.67 | 8.61 |
| Cobalt metal powder from example 3 | 8.51 | — | 8.69 | 8.69 | 8.68 |

Table 3 compares the particle sizes and BET specific surface areas of the cobalt metal agglomerates (determined using the nitrogen single point method to DIN 66 131) from example 3 with those of commercially available ultra- and extra-fine cobalt powders.

TABLE 3

(Particle size and specific surface areas)

| | FSSS [μm] | BET [m$^2$/g] |
|---|---|---|
| Co uF[1) | <1 | 1.4 |
| Co eF[2) | 1.2–1.4 | 0.8–1.0 |
| Cobalt metal agglomerate from example 3 | 1 | 2.5–3.5 |

We claim:

1. Cobalt metal agglomerates consisting of peanut-shaped primary particles with average particle sizes in the range from 0.5 to 2 μm, characterised in that they have a spherical secondary structure with average agglomerate diameters of 3 to 50 μm.

2. Cobalt metal agglomerates according to claim 1, characterised in that the agglomerate diameters are 5 to 20 μm.

3. Cobalt metal agglomerates according to one of claims 1 or 2, characterised in that they have a specific surface area in the range from 2 to 3.5 m$^2$/g.

4. Process for the production of cobalt metal agglomerates characterized in that cobalt salts of the general formula CoX$_2$, wherein X is selected from the group consisting of Cl.,–, NO$_3$– and ½ SO$_4$$^{2-}$, are continuously reacted with aqueous solutions or suspensions of carbonates selected from the group consisting of alkali metal carbonates, ammonium carbonates and hydrogen carbonates, at temperatures of between 40 and 100° C., in a tubular flow reactor to form spherical, basic cobalt carbonate, separating the said formed cobalt carbonate, washing it until it is free of neutral salt and then reducing it to yield cobalt metal agglomerates.

5. Process according to claim 4, characterised in that the cobalt carbonate which has been washed until free of neutral salt is converted into spherical cobalt hydroxide with alkali and/or ammonium liquors before the subsequent reduction.

6. Process according to either of claims 4 or 5, characterised in that the reaction with gaseous reducing agents is performed at temperatures of between 300 and 800° C.

7. The process of claim 4 wherein the reaction temperature is from 60 to 90° C.

8. The process of either of claims 4 or 7 wherein the reducing is performed with gaseous reducing agents and at a temperature of 350 to 650° C.

9. The process of claim 6 wherein the reducing is performed with gaseous reducing agents and at a temperature of 350 to 650° C.

10. Process making a cobalt article comprising sintering the metal agglomerates of claim 1.

11. Process of claim 10 wherein the agglomerates of claim 1 are co-sintered with additional material selected from the group consisting of diamond cubic boron-nitride (CBN), tungsten carbide, silicon carbide and aluminium oxide.

12. Process for making a positive electrode of an alkaline secondary battery selected from the class consisting of nickel/cadmium and nickel/metal hydride comprising sintering together the agglomerates of claim 1.

* * * * *